United States Patent [19]

Goldberg et al.

[11] 4,191,274
[45] Mar. 4, 1980

[54] ADJUSTING AUTOMOBILE SUSPENSION SYSTEM

[75] Inventors: Jerome Goldberg, Cold Spring; Christopher D. Bloch, Hillsdale, both of N.Y.

[73] Assignee: Spring Hill Laboratories, Inc., Cold Spring, N.Y.

[21] Appl. No.: 826,709

[22] Filed: Aug. 22, 1977

[51] Int. Cl.² .............................................. B62D 7/20
[52] U.S. Cl. ..................................... 180/282; 280/661
[58] Field of Search ............. 280/707, 6 R, 6 H, 6.11, 280/661; 180/103 R

[56] References Cited

U.S. PATENT DOCUMENTS

| | | | |
|---|---|---|---|
| 3,498,630 | 3/1970 | Crawford | 280/661 |
| 3,778,081 | 12/1973 | Takahashi et al. | 280/6 H |
| 3,936,071 | 2/1971 | Ricketts et al. | 180/103 R |

*Primary Examiner*—Richard A. Bertsch
*Attorney, Agent, or Firm*—Curtis, Morris & Safford

[57] ABSTRACT

An adjusting automobile suspension system providing a controlled camber response to the attitude of a vehicle, for example when the vehicle is navigating a turn. The system includes sensors that monitor the magnitude of centrifugal and vertical forces on the vehicle, the direction and degree that the steering wheel is being turned and camber of each wheel with respect to the vehicle body. In response to the sensed change in the vehicle's attitude, monitored by a central control processor, a series of servo mechanisms are activated to alter the camber of each wheel to maximize tire contact with the road.

10 Claims, 6 Drawing Figures

ADJUSTING AUTOMOBILE SUSPENSION SYSTEM

BACKGROUND OF THE INVENTION

1. Field of the Invention

This invention relates generally to automobile suspension systems, and more particularly is directed to an adjusting automobile suspension system responsive to sensed attitude changes of the vehicle. Responsive to the sensed changes the adjusting suspension system of the present invention changes the camber of the wheels to maximize road surface contact, especially when the vehicle is navigating a turn.

2. Description of the Prior Art

Various suspension systems have been devised to overcome the tendency of a vehicle to roll when navigating a turn. Some of these systems attempt to overcome the roll tendency imparted to the vehicle due to centrifugal force by correcting or compensating for the tendency of the vehicle to roll. Some such systems include anti-roll features to the suspension system. While such systems provide a sense of a level ride to the occupants of the vehicle, no correction is made to the position of the tires with respect to the road so that tire contact with the road when a vehicle is navigating a turn is less than it could be. With a lessened road surface contact between tires and the road, maneuverability as well as maximum speed are also lessened.

Other systems have been proposed which control the tilt of all four wheels equally. Such systems do not account for the fact that the left and right side of the vehicle are not loaded with an even weight distribution and do not require the same degree of tilt so that the corrections to the camber provided by such types of uniform chamber adjustment suspension systems do not fully maximize the contact between the road surface and tires of the vehicle. Another disadvantage to such suspension systems is that road surface irregularities, i.e., a bump in the road, can activate the tilt mechanisms of such suspension systems and initiate a correction when no correction is required.

SUMMARY OF THE INVENTION

The basic requirement of any automobile suspension system is to cushion the vehicle from irregularities in the road surface, such as bumps and dips, and to control the attitude of the tires in such a way that as much of the tire tread surface is in contact with the road surface as possible. The average passenger automobile suspension represents a compromise between maximum comfort and maximum tire contact with the road. The nature of the modern automobile tire is such that when a lateral force is applied to it, as in a turn, the tire tread tends to tuck under or roll slightly. Thus, if an automobile were to make a left turn while traveling at a sufficient speed, the right tire would roll in such a way that the left side of its tread would lift off the road surface unless corrective action to compensate for this tendency were employed. This principle is taken into consideration by most modern automobile suspensions but none of these systems can effectively control all four tires of the automobile simultaneously.

It is therefore clear that an ideal suspension would be one that could keep all four tire treads fully in contact with the road surface at all times while not being heavy or complicated so as to be impractical and at the same time afford the passengers in the vehicle maximum comfort under all driving conditions.

The factors which act on any vehicle, reduced to simplest form, are lateral and vertical forces. Thus, it is evident that any time the vehicle changes from a straight ahead attitude, at all but the slowest speeds, the lateral and vertical forces imposed on the vehicle will change. The vertical and horizontal forces acting on the vehicle are different at each wheel of the vehicle. This is due to the fact that when a vehicle navigates a turn, the lateral center of gravity shifts to the outside of the vehicle. In some cases, especially where the vehicle is navigating a turn at a high rate of speed, the tires on the inside of the car may be literally picked up off the road surface. While this occurs very rarely, it does demonstrate the significant difference in vertical force components acting on each side of the vehicle.

Lateral forces acting on a vehicle are essentially a function of the centrifugal force created when the vehicle negotiates a turn. The degree of lateral force (cornering traction) acting on each tire is a function of vertical force on that tire and centrifugal force. In the extreme case, where the inside tires of a vehicle leave the ground, it is evident that there would be no lateral forces on those tires because of the absence of any vertical forces. This situation clearly demonstrates that the forces acting on one side of a vehicle during a turn are quite different from the forces acting on the other side.

Accordingly, it becomes necessary to provide in a suspension system an additional means of sensing change attitude in a vehicle other than a sense in a change in lateral or vertical forces acting on the vehicle. One such way, as provided in the present invention, is to sense the degree of turning of the steering wheel and to use this sensed change in steering attitude as well as the sensed change in centrifugal force and vertical position of the wheels with respect to the vehicle, as affected by horizontal and lateral forces, to control the adjusting system of the present invention.

To accomplish this desired result, the adjusting suspension system of the present invention provides four basic elements, the first element consists of a group of sensors that monitor centrifugal force, the direction and degree that the steering wheel is turned, the relative height of each wheel with respect to the vehicle body and the camber of each wheel with respect to the vehicle body.

A second subsystem of the present invention includes a central processing unit which coordinates the signals from the various sensing means reading the sensed variations of the vehicle due to vertical and horizontal forces and change in steering attitude. This central processing unit correlates the signals received and in turn sends out signals to an adjusting mechanism at each wheel to cause an adjustment to be made to that wheel's camber. The adjustment is made by servo mechanisms associated with each wheel which, in response to the signals sent out by the central processor, controls a hydraulic or similar actuation member to effect changes in the camber of each wheel responsive to the signal generated.

Still another part of the suspension system of the present invention is a means to check on the operability of the other three systems so that if any malfunction occurs in any one of the other systems the control system is deactivated to allow the suspension system to behave as a normally suspended vehicle without the adjusting feature. The resulting suspension system places the vehicle wheels at the ideal angle of camber in response to any change in the attitude of the vehicle and road surface.

Accordingly, it is an object of the present invention to provide a vehicle suspension system to control suspension geometry responsive to sensed variations in vertical and lateral forces acting on the vehicle and steering wheel position.

It is a further object of the present invention to provide an automatically adjustable vehicle suspension system to maximize road surface contact of the vehicle tires under all conditions of vehicle operation.

It is a still further object of the present invention to provide an automatically adjustable vehicle suspension system to adjust the camber of each wheel of the vehicle independently of the others in response to sensed changes in the vehicle attitude in order to maximize contact between the road surface and each individual wheel.

The above, and other objects, features and advantages of this invention, will be apparent in the following detailed description of an illustrative embodiment which is to be read in connection with the accompanying drawings.

DETAILED DESCRIPTION OF A PREFERRED EMBODIMENT

Figure 1:
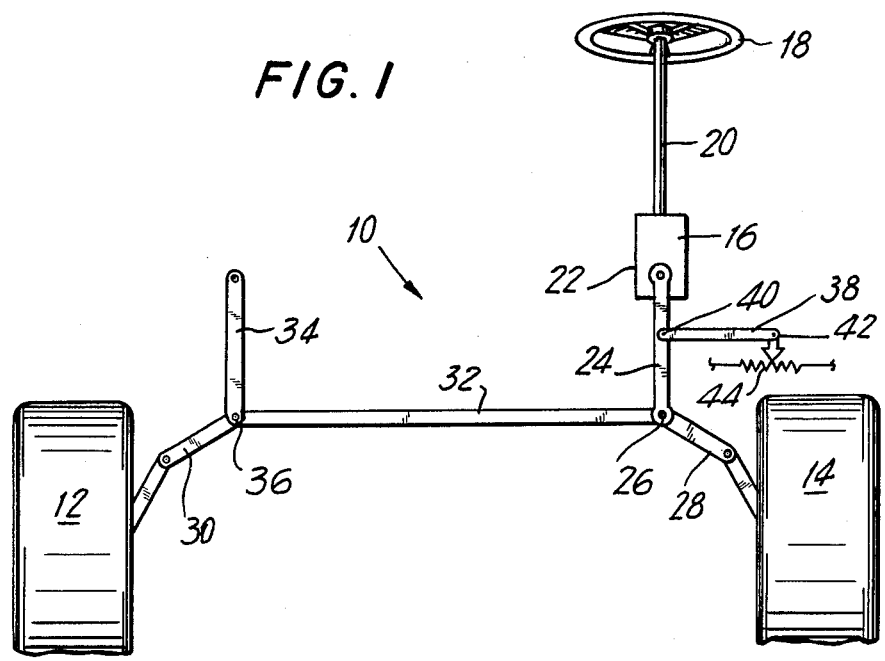
FIG. 1 is a diagrammatic representation of the front wheels and steering mechanism of an automobile to illustrate the manner in which the adjusting suspension system of the present invention senses vehicle turning.
Figure 2:
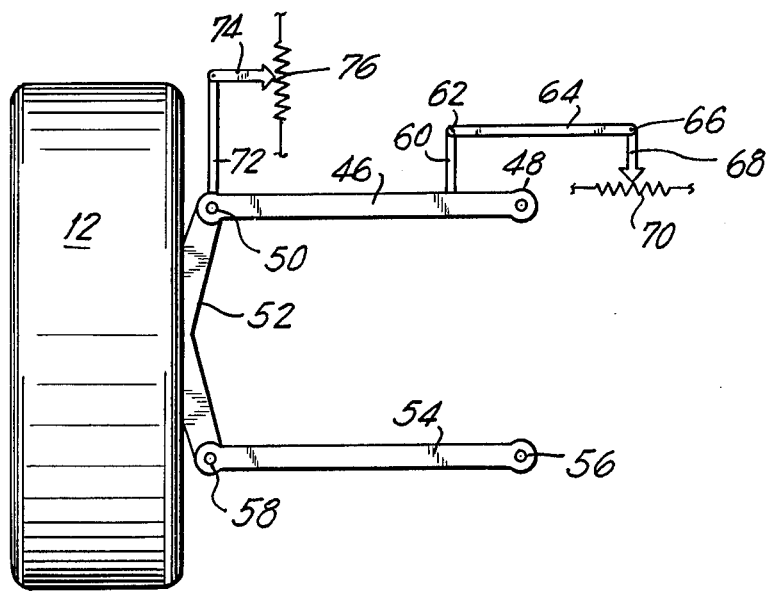
FIG. 2 is a diagrammatic representation of an automobile wheel and suspension to illustrate the manner in which the adjusting suspension system of the present invention senses changes in wheel camber and vertical displacement with respect to the vehicle body.
Figure 3:
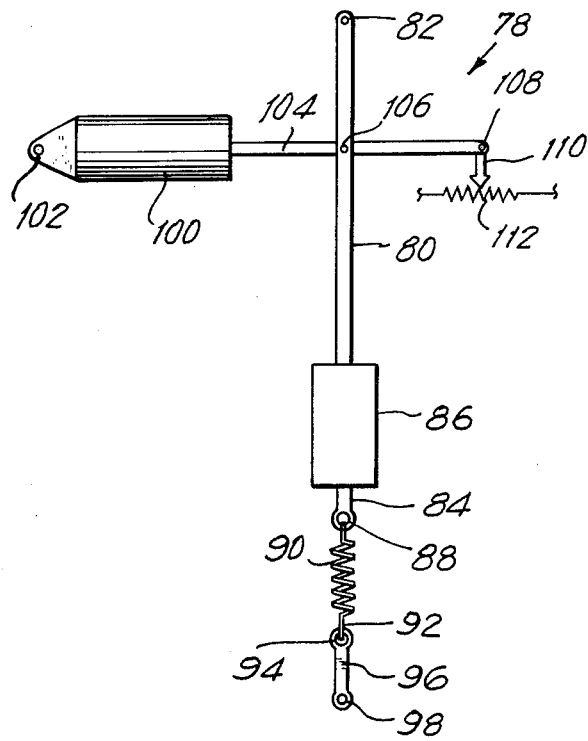
FIG. 3 is a diagrammatic representation of the mechanism employed to sense centrifugal force acting on the vehicle.

Referring to the drawings, and initially to FIGS. 1 through 3 thereof, there are shown diagrammatic representations of a portion of the adjusting suspension system 10 in accordance with the present invention. Illustrated in FIG. 1 are front wheels 12 and 14 of a typical automobile vehicle and a steering assembly 16. The steering assembly, which may be a conventional automobile steering assembly, includes steering wheel 18, steering column 20 and steering box 22 which controls the output of pitman arm 24. The pitman arm 24 is pivotally linked, as at 26, to the vehicle left front wheel 14 through steering linkage 28 and to the steering linkage 30 for the vehicle right side wheel 12 by drag link 32. An idler arm 34 is also pivotally linked, as at 36, to drag link 32 and right side steering linkage 30.

According to the present invention, information as to the attitude of the steering wheel is supplied to the central control processor and, accordingly, means are provided to sense changes in the steering attitude of the vehicle. To accomplish this, a linkage member 38 is provided having one end 40 linked to pitman arm 24 and its other end having a control arm 42 extending therefrom in wiping engagement with a variable resistor 44. Thus as the vehicle is steered through a turn the corresponding movement of pitman arm 24 of the steering assembly causes movement of control arm 42 along variable resistance 44. This provides an indication of the relative position of the steering wheel attitude by reason of the change in voltage drop sensed across variable resistance 44. Thus changes in voltage drop are correlated to the degree of turning of the steering wheel.

Referring now more particularly to FIG. 2, a typical wheel assembly is illustrated along with a means to measure the effect of vertical forces acting on the vehicle at that wheel and to also provide an indication as to the camber attitude of the wheel. Each of the four wheels of the vehicle are provided with an assembly similar to that shown in FIG. 2. Thus, as shown, each wheel assembly includes an upper control arm 46 secured at one end 48 to a movable actuation member, to be described hereinbelow, and at its other end 50 pivotally connected to the upper end of a spindle 52. A lower control arm 54 is also provided having one end 56 fixed to the vehicle chassis (not shown) and its other end 58 pivotally connected to the lower end of spindle 52.

To indicate the camber attitude of wheel 12 an arm 60 is provided fixed to upper control arm 46. Arm 60 is pivotally linked, as at 62, to one end of a linkage member 64 which is in turn pivotally linked at its other end, as at 66, to a control arm 68 in operative wiping engagement with a variable resistor 70. Thus as the camber of wheel 12 changes, upper control arm 46 will move correspondingly causing a corresponding movement in control arm 68 across the variable resistor 70. Variations in the sensed voltage drop across variable resistor 70 may then be correlated with the change in the camber attitude of the wheel with respect to the chassis. This information is sent to the central control processor of the present invention as will be explained more fully hereinbelow.

To sense the effects of vertical forces acting on the vehicle, one end of a linkage 72 is provided fixed to end 50 of upper control arm 46. A control arm 74 extends from the other end of linkage 72 and is in wiping engagement with a variable resistor 76 fixed to the vehicle chassis. Thus, as vertical forces are imparted to the vehicle, for example due to a bumpy road or due to the vehicle navigating a turn, the degree of relative displacement between the wheel and the chassis may be determined through a correlation of the change in the sensed voltage across variable resistor 76. As with the sensed voltage across variable resistors 44 and 70 the change in voltage across variable resistor 76 is fed to the central control processor of the present invention.

Reference is now made to FIG. 3 which diagrammatically illustrates a mechanism 78 to sense when the vehicle is subjected to centrifugal forces. Mechanism 78 is preferably located along the longitudinal axis of the vehicle and includes a central linkage arm 80 pivotally secured at one end 82 to the vehicle chassis. A weight 86 is provided on linkage arm 80 adjacent its other end 84. End 84 is connected to one end 88 of a centering spring member 90. The other end 92 of centering spring 90 is hooked to one end 94 of a linkage member 96 with the other end 98 of linkage member 96 being pivotally fixed to the vehicle chassis. A hydraulic damper 100 is also provided having one end 102 pivotally fixed to the vehicle chassis with an extending damping rod 104 being pivotally connected, as at 106, along a midpoint of rod 104 to rod member 80. The free end 108 of rod member 104 includes an extending control arm 110 in wiping engagement with a variable resistor 112. It is thus evident that as the vehicle navigates a turn centrifugal forces are imparted to the vehicle and act on weight 86 tending to displace weight 86 outwardly with respect to the direction of the vehicle turn. This displacement results in a movement of extending rod 104 of damper 100 changing the position of control arm 110 in engagement with variable resistor 112 which provides a sensed voltage variation in the same manner as the sensed voltage variation of variable resistors 44, 70 and 76. This sensed voltage variation is also fed to the central control processor of the present invention.

Figure 4:
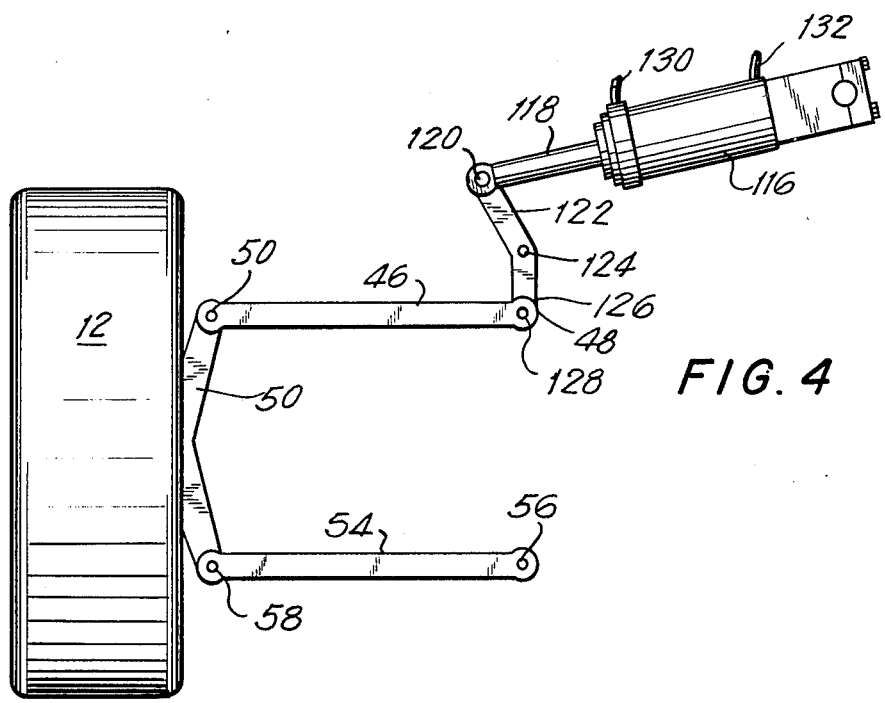
FIG. 4 is a diagrammatic representation of a vehicle wheel and suspension showing interconnection of a hydraulic servo mechanism in order to control wheel camber.
Figure 5:
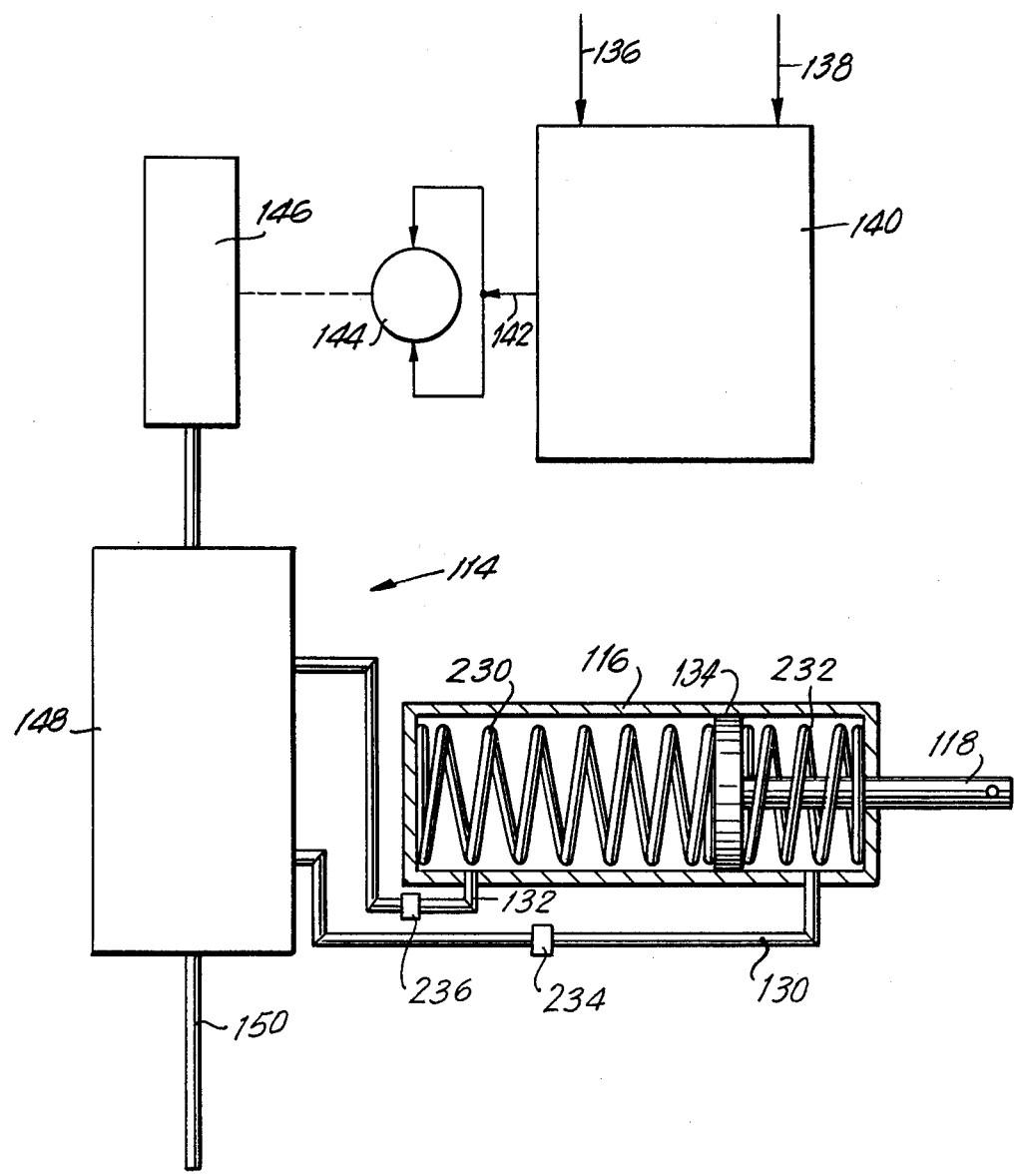
FIG. 5 is a diagrammatic representation of the servo control system of the present invention.

With reference now to FIGS. 4 and 5, a preferred camber adjusting assembly 114 is shown. Assembly 114 is responsive to signals received from the central control processor and adjusts the camber of each individual wheel according to the predetermined camber to maintain maximum road surface contact between the tire tread and the road as dictated by the sensed attitude of the vehicle. The camber control assembly 114 includes a hydraulic cylinder 116 pivotally fixed to the vehicle chassis having an extendable and retractable piston extension arm 118 pivotally linked at its free end, as at 120, to a linkage member 122. Linkage member 122 is a crank arm pivotally mounted at some intermediate point 124 to the vehicle chassis and having its end 126 pivotally secured, as at 128, to end 48 of upper control arm 46. Hydraulic hoses 130 and 132 deliver incompressible hydraulic fluid under pressure to opposite sides of the piston 134 (see FIG. 5) of hydraulic cylinder 116 to extend and retract piston extension arm member 118. With hydraulic fluid entering cylinder 116 through hose 132 piston arm 118 extends moving the upper control arm 46 to the right, as viewed in FIG. 4, thereby adjusting the camber of wheel 12 to one where the wheel is inclined toward the right. Hydraulic fluid supplied through line 130 causes piston arm 118 to retract and, consequently, move upper control arm 46 to the left to adjust the camber of wheel 12 so that the wheel inclines to the left.

Adjustment of the camber of any of the wheels of the vehicle is made responsive to signals received from the central control processor. As best shown in FIG. 5, an input signal, indicated at 136, and a feedback signal, indicated at 138, generated by the change in voltage across the variable resistor 70 feed into a servo drive amplifier 140. The servo drive amplifier 140 includes circuitry that balances inputs of the two signals and has an output signal indicated at 142 which drives a DC motor 144 connected to a gear reduction unit 146 to drive a hydraulic control valve assembly 148. The control valve assembly 148 controls hydraulic fluid under pressure received from an input 150 and diverts it to either of the hydraulic fluid lines 130 or 132 to activate hydraulic cylinder 116 for adjustment of the camber of wheel 12.

Servo drive amplifier 140, in effect, balances the input signal from the central processor, 136, and the feedback signal generated by variable resistor 70, 138, to operate the motor 144 to move upper control arm 46 until the signal fed back through feedback 138 equals the signal fed by 136 sent from the central control processor.

Figure 6:
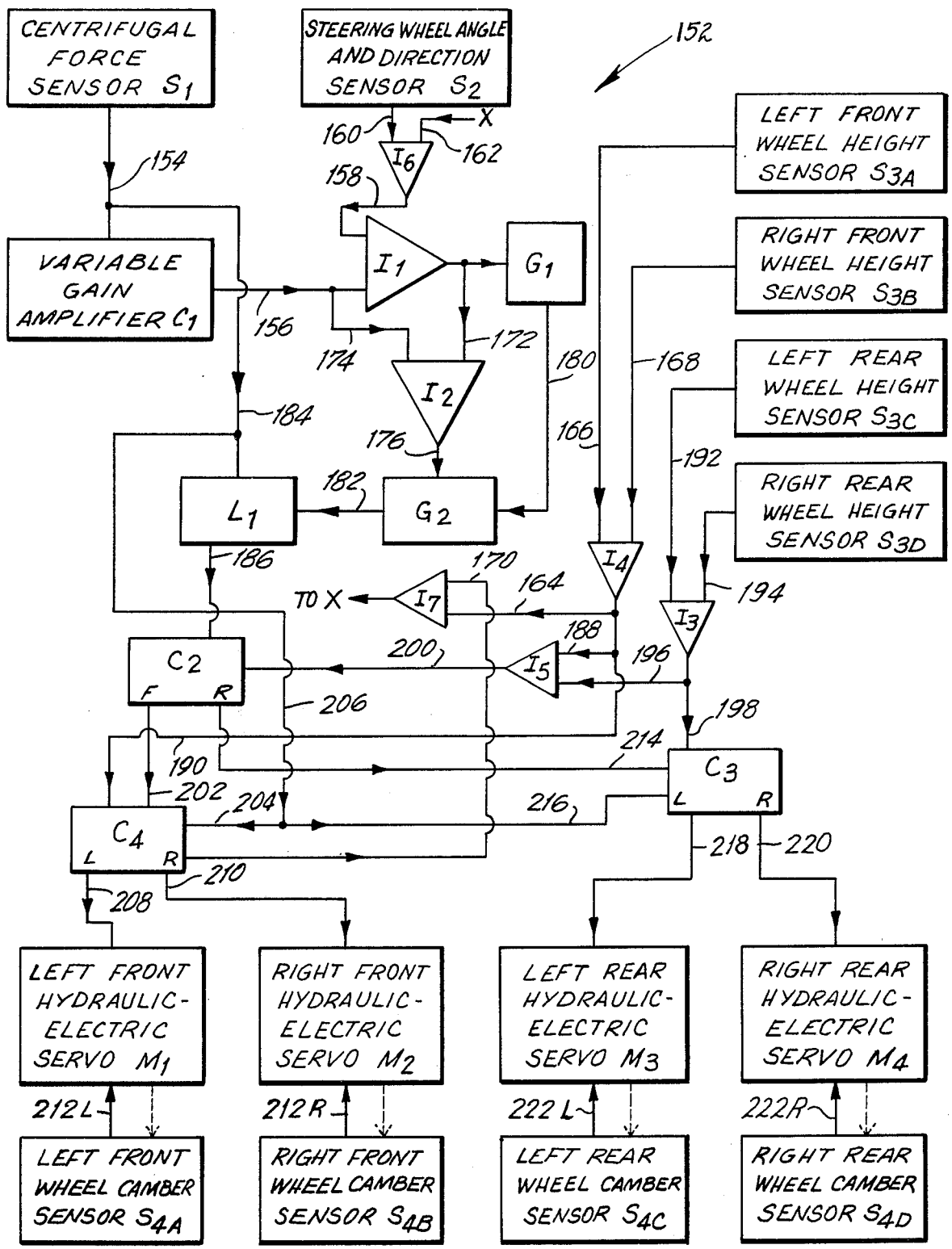
FIG. 6 is a block diagram showing the input and output to the central information processor of the present invention.

Reference is now made to FIG. 6 for a block diagram of the central control processor indicated generally by 152. As indicated above, variable resistors 76 at each wheel of the vehicle, 44 associated with the steering column and 112 which senses centrifugal force on the vehicle, produce a signal responsive to the respective sensed attitude and all send these signals to the central control processor 152. The centrifugal force sensor is shown in the block diagram as $S_1$, the steering wheel angle and direction sensor shown as $S_2$ and the left front wheel height sensor, right front wheel height sensor, left rear wheel height sensor and right rear wheel height sensor are shown as $S_{3A}$, $S_{3B}$, $S_{3C}$, and $S_{3D}$, respectively. All of the sensors and circuitry use a regulated power supply that not only provides a constant voltage but also filters out any interference present in the vehicle's electrical system.

The signal from the centrifugal force sensor $S_1$, the main source of information as most camber corrections are necessitated because of the vehicle navigating a turn, and indicated at 154, is fed to a variable gain amplifier $C_1$. The output of amplifier $C_1$, indicated at 156, is fed into an integrator $I_1$. Integrator $I_1$ also receives a combined signal from an integrator $I_6$, shown at 158, which is an integrated signal derived from steering wheel angle and direction sensor $S_2$, shown at 160, and an integrated signal from an integrator $I_7$, shown at 162. Integrator $I_7$ in turn receives an integrated signal generated from an integrator $I_4$, shown at 164. Integrator $I_4$ receives signals generated by the left front wheel height sensor $S_{3A}$, shown at 166, and a signal from the right front wheel height sensor $S_{3B}$, shown at 168. Integrator $I_7$ also receives a signal, shown at 170, which is a feedback signal from a double integrator $C_4$, as will be explained more fully hereinbelow.

Thus, the output from integrator $I_1$, a combination of signals representing indications of a change in turning attitude of the vehicle, feed to an integrator $I_2$, as shown at 172. The output of amplifier $C_1$ is zero when there is no centrifugal force acting on the vehicle and the output swings positive or negative depending on the direction of the turn and is proportional to the amount of centrifugal force acting on the vehicle. In like manner, the output of steering wheel angle and direction sensor $S_2$ is zero when the steering wheel of the vehicle is in the straight ahead position and swings positive or negative as the wheel is turned left or right in an amount proportional to the change in the steering wheel angle. As the car turns in one direction, the output of amplifier $C_1$ and $I_6$ will be of the same polarity. In essence, the output of integrator $I_1$ represents an error signal that is greater when the steering wheel must be turned more than normal to obtain a given centrifugal force, for example, on a gravel road $I_1$ will generate an error signal while on a hard paved road, the error would be essentially zero.

The output of amplifier $C_1$ through line 174 and the output from integrator $I_1$ through line 172 are fed into integrator $I_2$. The output of integrator $I_2$, shown at 176, yields a value for wheel camber which takes into consideration the type of road surface the vehicle is driving on. The error signal from integrator $I_1$, shown at 178, feeds into a threshold detector or trigger $G_1$ with an output 180 feeding a gating circuit $G_2$. The output from integrator $I_2$ also feeds into gating circuit $G_2$. In essence, gating threshold detector $G_1$ senses if the output from integrator $I_1$ is very great and if it is, causes the output of gating circuit $G_2$ to be zero. Otherwise, the output from gating circuit $G_2$, shown at 182, is the same as the output from integrator $I_2$. Some conditions which would cause the output of gating circuit $G_2$ to be zero would result if the vehicle were to be navigating a turn very slowly so that the centrifugal force imparted to the vehicle was negligible, or if the car were steering out of control, as in a skid. In both cases, the zero output of gating circuit $G_2$ would call for a zero camber of the wheel which is the desired wheel camber for such a vehicle attitude.

The output from $G_2$, as well as the signal from centrifugal force sensor $S_1$, shown at 184, feed into a gated latch circuit $L_1$ which acts as a latch-memory. The output from $L_1$, shown at 186, is the output exactly as it comes from the output of $G_2$ unless the latch-memory $L_1$ senses a rapid change in the signal from $S_1$. Thus, as long as the signal from $S_1$ is uniform, $L_1$ outputs the same signal received from $G_2$. In the event the signal from $S_1$ indicates a rapid change, for example, such an occurrence is possible if the weight 86 in the centrifugal force sensor were disturbed as might be the case if the vehicle hit a large bump, the latch-memory $L_1$ retains the output last received from $G_2$ and continues to output this signal rather than the rapid change signal received from sensor $S_1$. Rapid changes in centrifugal force sensed also may occur as the vehicle swerves rapidly from a straight line path, for example, to avoid an impediment in the road, and then resumes a straight ahead path. Latch-memory $L_1$ provides a delay to the response to such rapid changes in centrifugal force and maintains the normal output received from $G_2$ for a sufficient time so that any abrupt changes in centrifugal force do not initiate a response to change wheel camber. Thus, the output of $L_1$ represents a value that if properly interpreted is correlated to the degree of wheel camber required at each wheel with respect to the road for the driving conditions sensed.

The signals generated from the height sensors, $S_{3A}$, $S_{3B}$, $S_{3C}$ and $S_{3D}$, provide an indication of load imbalance in the vehicle as well as an indication of vehicle turning. This is so because the roll imparted to the vehicle during a turn will alter the vertical orientation of the vehicle's chassis with respect to the wheels. Thus, as noted above, signals from the front wheel sensors $S_{3A}$ and $S_{3B}$ are received by integrator $I_4$. The output from $I_4$ is fed to an integrator $I_7$, as at 164, as well as to an integrator $I_5$, as at 188, and to a gated memory integrator $C_4$, as at 190. Signals from the rear wheel height sensors $S_{3C}$ and $S_{3D}$ are received at an integrator $I_3$, through 192 and 194, respectively, and the output of integrator $I_3$ is sent to integrator $I_5$, as at 196, and to a gated memory integrator $C_3$, as at 198. The output from integrator $I_5$, shown at 200, is the second input to double integrator $C_2$ and this input along with the input from latch memory $L_1$, shown at 186, are the two signals provided to double integrator $C_2$. In essence, the integrated signal, at 200, coming from integrator $I_5$ provides an indication of load distribution in the vehicle as well as an indication of vehicle roll as it navigates a turn. Thus, if the trunk of a vehicle were loaded with heavy objects the initial signals sent from rear wheel height sensor $S_{3C}$ and $S_{3D}$ would indicate an uneven load distribution in the vehicle and the output of $I_5$, at 200, fed into double integrator $C_2$ would provide a signal output indicating a desired change in wheel camber, i.e., a different value for the wheel camber than if the vehicle were unloaded. Thus wheel camber is adjusted for load distribution.

One output from double integrator $C_2$, at 202, feeds gated memory integrator $C_4$ which also receives an input, at 204, of a signal directly from centrifugal force sensor $S_1$ through line 206. Thus the input signals 202 and 204, which are integrated signals correlating indications of centrifugal force acting on the vehicle and indications of load distribution in the vehicle as well as indications of turning of the vehicle, respectively, are fed to gated memory integrator $C_4$. The outputs from gated memory integrator $C_4$, at 208 and 210, respectively, are the signals fed to servo drive amplifier 140, as indicated at 136 in FIG. 5. The correlating signal indicated at $212_L$ and $212_R$, respectively, is the signal generated by variable resistor 70 at each wheel and provides an indication of the actual camber of the wheel. Thus, as explained above, servo drive amplifier 140 controls the hydraulic cylinder 116 until the input signals 208 and 210 equal the signal returned from wheel camber measurement indicators $212_L$ and $212_R$, respectively.

In like manner control of the camber of the rear wheels is accomplished from output signals of gated memory integrator $C_3$ which receives a first input, at 198, from the output of integrator $I_3$ and a second input, at 214, from the output of double integrator $C_2$. In addition, integrator $C_3$ receives a signal, at 216, which is a direct signal from centrifugal force sensor $S_1$. The outputs from gated memory integrator $C_3$, at 218 and 220, go respectively to the left and right rear hydraulic servo units 140 associated with each wheel. As with the servo units controlling the front wheels the feedback signal from the variable resistor 70 associated with each rear wheel is indicated at $222_R$ and $222_L$.

Both of the gated memory integrators $C_3$ and $C_4$ receive a signal directly from the centrifugal force sensor $S_1$ and this signal is an error check on the signal received from $S_2$ to indicate whether centrifugal force being sensed by $S_1$ is directly related to steering wheel turn angle, indicating the vehicle is navigating a turn, or whether the centrifugal force signal sensed is due to an extraneous factor or an instantaneous response which does not require correction in wheel camber. In addition, as noted above, one of the outputs from $C_4$, at 170, is provided as an input to integrator $I_7$ and then as an input, at 162, to integrator $I_6$. This signal acts as an error control in that if the vehicle is loaded unevenly left to right, for example, if only the driver is a passenger in the vehicle, this signal will alter the geometry in a predetermined way to provide a base signal upon which further determinations of change in the wheel camber are to be made. In essence, the uneven left to right loading is removed as a factor in consideration for change in wheel camber when changes in wheel camber are indicated by changes in centrifugal force and steering angle.

Each of the gated memory integrators $C_3$ and $C_4$ have three inputs. One input to each comes from integrator $C_2$ which generates an output that represents desired wheel camber for the front and rear based on signals received from $S_1$, centrifugal force sensor, $C_1$, the variable gain amplifier, $S_2$, steering wheel angle and direction sensor, and $I_5$, an integrated signal providing information with respect to front to rear weight distribution. A second input to gated memory integrators $C_3$ and $C_4$ comes from integrators $I_3$ and $I_4$ and provide information with respect to left to right weight distribution for the rear and front of the vehicle, respectively. The third input to gated memory integrators $C_3$ and $C_4$ comes directly from centrifugal force sensor $S_1$.

Gated memory integrators $C_3$ and $C_4$ have a built in memory feature which retains the value of the signal from integrators $I_3$ and $I_4$, respectively, whenever the signal received directly from $S_1$ changes from zero, i.e., an indication that no centrifugal forces are acting on the vehicle. However, whenever the value of the signal from $S_1$ changes from zero, integrators $C_3$ and $C_4$ behave as an ordinary integrator but uses the remembered value of the last signal received from $I_3$ and $I_4$, respectively, that last existed when the signal from $S_1$ was zero. This gated memory operation tends to filter out the effects of bumps and also compensates for static changes in weight distribution in the vehicle due to passenger and/or cargo loading.

As noted above, the adjusting automobile suspension system of the present invention may be designed with a check on the operability of the adjusting system. Thus, if a malfunction occurs, the fail safe system operates to deactivate the adjusting feature of the suspension to allow the vehicle to behave as a non-adjusting standardly suspended vehicle.

The "fail-safe" provision locks out camber adjustment if a problem occurs in the hydraulic system. Suitable controls are present in the central control processor to monitor malfunctions in the electronic systems. For a mechanical override, each of the hydraulic cylinders 116 are provided with an internal spring 230 and 232, respectively, (see FIG. 5) on each side of the piston 134. Each of the hydraulic lines 130 and 132 are provided with pressure sensing switches 234 and 236, respectively, which sense when hydraulic pressure in these lines falls below a predetermined level. If pressure loss is sensed, switches 234 and 236 respond and disconnect the hydraulic pressurization system so that no hydraulic fluid is supplied.

With an absence of hydraulic fluid, springs 230 and 232 center the piston 134, which is a zero camber for each wheel. Thus wheel camber would be maintained at a neutral position and the vehicle would perform as a standard normally suspended vehicle. With pressurization of the cylinders, the springs do not affect the position of piston 134 so that the cylinders are controlled only by hydraulic pressure.

It is thus seen that the present invention provides an adjusting automobile suspension system which automatically adjusts the camber on each individual wheel according to sensed responses due to variations in centrifugal force, steering wheel angle and load imbalances on the vehicle. With the precise adjustment of the wheel camber of each individual wheel of a vehicle, the wheel surface and contact with the road surface is maximized affording the vehicle greater stability, especially when navigating curves, allowing the vehicle to navigate curves at a higher rate of speed without impairing safety and road handling ability of the vehicle.

We claim:

1. An adjusting vehicle suspension system for a vehicle having a chassis and an individual suspension system at each wheel of the vehicle comprising
    sensing means at each wheel of the vehicle to sense the height of the vehicle chassis with respect to each said wheel;
    sensing means on said vehicle to sense changes in steering wheel direction of said vehicle;
    sensing means on said vehicle to sense centrifugal force acting on said vehicle;
    control means carried by said vehicle to receive the sensed changes in vehicle height with respect to each said wheel, changes in steering wheel direction of said vehicle and centrifugal force acting on said vehicle;
    said control means including means for controlling camber adjustment means at each said wheel to effect changes in wheel camber to maintain optimum road contact between each said wheel and the road according to a predetermined camber for each wheel based on a correlation of the centrifugal force acting on the vehicle displacement of the vehicle sensed at each wheel.

2. An adjusting vehicle suspension system for a vehicle as defined in claim 1 wherein said camber adjustment means at each said wheel includes activated means operative to adjust each said wheels camber responsive to a signal received from said control means.

3. An adjusting vehicle suspension system for a vehicle as defined in claim 2 including servo control means operative to control said activated means responsive to said signal received from said control means.

4. An adjusting vehicle suspension system for a vehicle as defined in claim 3 including means at each said wheel to sense the actual degree of wheel camber of each wheel.

5. An adjusting vehicle suspension system for a vehicle as defined in claim 4 including means to send the sensed changes in wheel camber from said wheel camber sensing means to said servo control means whereby said servo control means is operative to adjust wheel camber until the signal received from said control means equals the signal received from said wheel camber sensing means.

6. An adjusting vehicle suspension system for a vehicle as defined in claim 1 including means within said control means to discern between vehicle conditions of short duration such as bumps and rapid steering wheel direction changes to preclude wheel camber adjustments responsive to such short duration conditions.

7. An adjusting vehicle suspension system for a vehicle as defined in claim 1 wherein said control means includes means to adjust wheel camber responsive to sensed static load distribution in said vehicle.

8. An adjusting vehicle suspension system for a vehicle as defined in claim 1 wherein said control means includes means for adjusting wheel camber at each wheel to a neutral camber position when said vehicle is sensed to be in a skid attitude.

9. An adjusting vehicle suspension system for a vehicle as defined in claim 1 including means to detect a malfunction in the system to lock out said camber adjustment means at each wheel and maintain each said wheel at a neutral camber attitude when a malfunction is sensed.

10. An adjusting vehicle suspension system for a vehicle as defined in claim 1 wherein said activated means comprises hydraulically activated means.

* * * * *